No. 815,126. PATENTED MAR. 13, 1906.
E. C. SMITH.
COFFEE CUTTING MILL.
APPLICATION FILED AUG. 29, 1903.
2 SHEETS—SHEET 1.
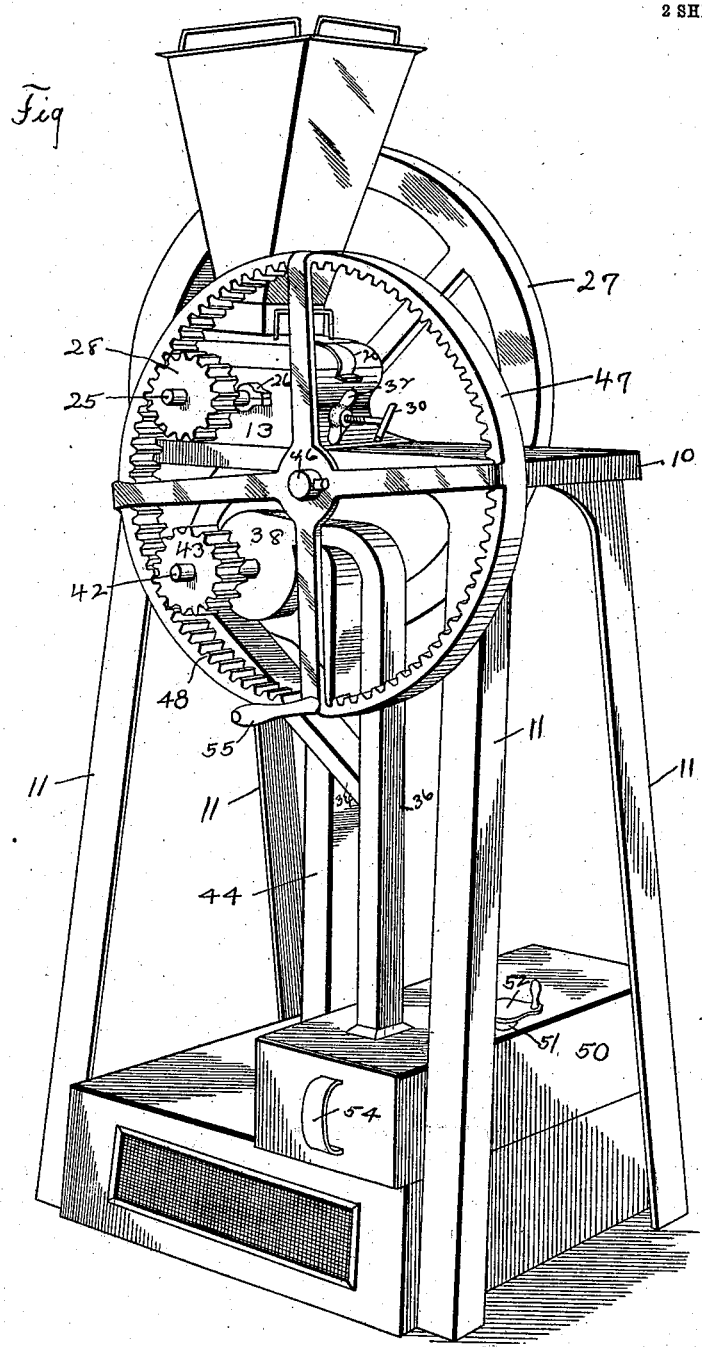

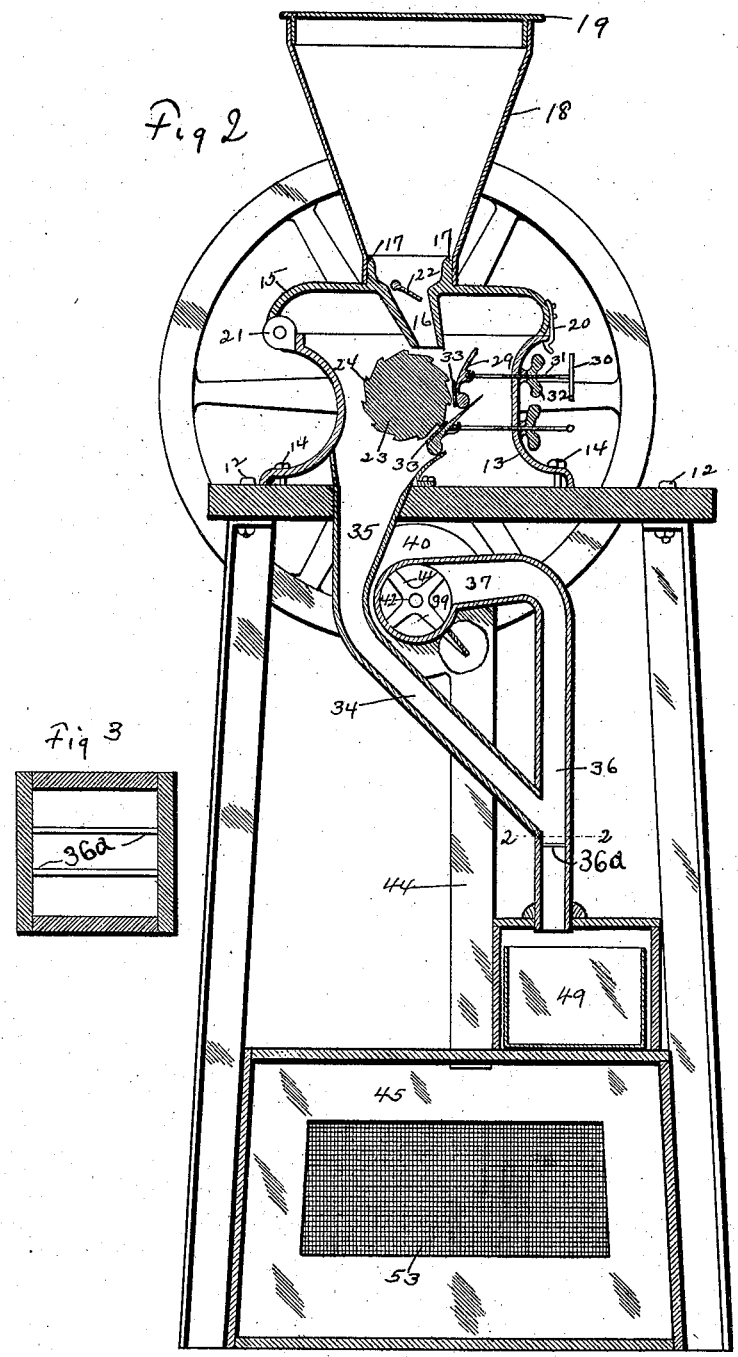

UNITED STATES PATENT OFFICE.

ELVAH C. SMITH, OF NEWTON, IOWA.

COFFEE-CUTTING MILL.

No. 815,126.

Specification of Letters Patent.

Patented March 13, 1906.

Application filed August 29, 1903. Serial No. 171,300.

*To all whom it may concern:*

Be it known that I, ELVAH C. SMITH, a citizen of the United States, residing at Newton, in the county of Jasper and State of Iowa, have invented a certain new and useful Coffee-Cutting Mill, of which the following is a specification.

The objects of my inventon are to provide a mill of simple, durable, and inexpensive construction especially designed for cutting coffee and for removing from the product the fine dust and hulls and other particles of lighter weight than the cut coffee.

My invention consists in certain details in the construction, arrangement, and combination of the various parts of the device whereby the objects contemplated are attained, as hereinafter more fully set forth, pointed out in my claims, and illustrated in the accompanying drawings, in which—

Figure 1 shows a perspective view of the complete machine. Fig. 2 shows a vertical central sectional view of the complete machine, and Fig. 3 shows a detail sectional view on the line 2 2 of Fig. 2.

Referring to the accompanying drawings, I have used the reference-numeral 10 to indicate the platform which supports the cutting mechanism and which in turn rests upon the legs 11 and is secured thereto by bolts 12. On top of the platform 10 is the casing 13, secured to the platform by the bolts 14 and open at its top. Hinged to the top of the casing 13 is the cover 15, having formed in its upper central portion a funnel-shaped extension 16, provided with an upwardly-projected flange 17, which flange supports the funnel-shaped hopper 18, which is provided with a cover 19. The front of the top 15 is detachably connected with the casing 13 by the spring-lock 20, and the rear of the top is connected with the casing 13 by the hinge 21. In the funnel-shaped extension 16 of the top I have provided a cut-off 22, designed to regulate the flow of coffee from the hopper into the casing. Mounted in the central portion of the casing is a shaft 25, passed through a bearing-box 26 in the casing and having at its central portion a cutting-roller 23, formed with longitudinal cutting edges 24, with grooves between them. On one end of the shaft 25 is a balance-wheel 27, and on the other end is a pinion 28. On the interior of the casing 13 in front of the cutting-roller 23 is a knife-supporting device 29, pivoted at its lower end, so that its upper end may swing to and from the cutting-roller. The said upper end projects outwardly and forwardly from the roller, forming with the roller a substantially V-shaped throat. Mounted on the inner face of the knife-support 29 is a knife-blade 33, having its upper edge sharpened to coact with the cutting-roller. I adjust the knife 33 relative to the cutting-roller by means of a rod 30, passed through the front of the casing 13 and pivotally connected with the knife-support 29, and I lock this rod 30 in position by placing a locking thumb-nut 32 on the screw-threaded portion 31 of the rod, this locking thumb-nut engaging the front of the casing. In this way the cutting edge of the knife 33 may be adjusted with great accuracy relative to the cutting-roller 24 and will firmly hold it in any position in which it may be placed. The upper end of the knife-support 29 serves to guide the stock to position between the knife 33 and the cutting-roller. Immediately beneath the knife-supporting device 29 is a second knife-supporting device of similar construction bearing the knife 33 and provided with an adjusted rod the same as the one just described. This latter adjusting-rod is not illustrated in Fig. 1 and in this respect is a modification. Immediately below the lower knife and the cutting-roller is a tube 34, having a funnel-shaped top 35, designed to receive the cut stock from between the lower knife and the cutting-roller. This tube 34 projects downwardly and forwardly and enters a vertical tube 36. In this vertical tube 36 is a number of cross-rods 36ª, as shown in Fig. 3, designed to receive the cut stock and slightly separate it for purposes hereinafter made clear. At the top of the tube 36 is an extension 37, extended rearwardly and entering a casing 38, which casing communicates, by means of the opening 39, with the fan-casing 40, containing a fan 41 of ordinary construction. Mounted upon the shaft 42 is a pinion 43 for driving the fan. Communicating with the fan-casing is a tube 44, extending straight downwardly into a receptacle 45 at the bottom of the frame. This receptacle is provided at one side with a fine screen 53 for purposes hereinafter made clear.

The numeral 46 indicates a shaft supported beneath the platform 10 and having a rim 47 supported thereon and provided with cog-teeth 48 on its inner periphery, the said cog-teeth 48 meshing with the pinions 28 and 43 to provide for driving said pinions when the said wheel 47 is rotated. A handle 55 is attached to the wheel 47, by which it may be manually operated. Directly beneath the tube 36 is an open-top box 49 to receive the cut stock from the spout 46. This box is provided with a handle 54 and is placed in a receptacle 50. The top of the receptacle is formed with an opening 51, and a slide 52 is provided by which said opening may be wholly or partially covered.

In practical use the coffee is placed in the hopper 18, and the cut-off 22 is set to permit the proper quantity of coffee to pass to the cutting devices. Then the handle 55 is turned and the rotating cutter 23 and the fan are both operated. A small quantity of coffee is held in the V-shaped throat between the knife-support 29 and the rotating cutter, and each time that one of the sharpened blades of the rotary cutter engages the coffee held on the knife-supporting device it will coact with the knife 33 in cutting off a part of the coffee grains with which it engages. By manipulating the rod 30 the knife 33 may be brought as close as desired to the rotary cutter, and hence the coffee may be reduced to particles as fine as desired. If two of the knives 33 are used, as shown in Fig. 2, then the upper one is preferably set to cut the coffee into relatively large particles and the lower one is set closer to the rotary cutter, so that the coffee is reduced to still smaller particles before passing beyond the lower knife. All of the cut product passes downwardly through the tube 34. The rotation of the fan 41 causes an air-current to pass upwardly through the tube 36, then through the fan-casing, then down through the tube 44, and finally outward through the screen 53. There is no air-current of any kind in the tube 34, so that all of the cut product no matter how light in weight may pass away from the cutting device and downwardly to the tube 34, until it enters the tube 36. At this point it encounters a strong air-current in the tube 36, and the cross-rods 36ª serve to separate the cut product, so that the air-currents in the tube 36 may carry upwardly all of the fine dust, the small pieces of hull, and other products of light weight, while the cut coffee of uniform size and weight will all pass into the box 49. The light particles before described will be discharged into the receptacle 45, where they will remain, and the screen 53 provides for the discharge of the air from the receptacle 45, but prevents the particles of coffee in the receptacle from passing out.

Having thus described my invention, what I claim, and desire to secure by Letters Patent of the United States therefor, is—

1. In a coffee-cutting mill, the combination of a closed receptacle for receiving cut coffee, said receptacle formed with an opening, a slide for covering the opening, a fan-casing, a tube communicating with the top of the receptacle for cut coffee extended upwardly and into the fan-casing, a tube communicating with the fan-casing and extending downwardly therefrom to a point of discharge, a fan for creating a current of air upwardly from the coffee-receptacle and downwardly to the point of discharge, coffee-cutting mechanism, a tube extending from the coffee-cutting mechanism downwardly and laterally and discharging into the tube which communicates with the coffee-receptacle and a number of cross-rods in the tube communicating with the coffee-receptacle directly below the point where the tube from the coffee-cutting devices enters it.

2. In a coffee-mill, the combination of a receptacle for receiving cut coffee, said receptacle formed with an opening, a slide for controlling said opening, a fan-casing, a tube communicating with the top of the receptacle for cut coffee, extended upwardly and into the fan-casing, a tube communicating with the fan-casing and extending downwardly therefrom to a point of discharge, a fan for creating a current of air upwardly from the coffee-receptacle and downwardly to the point of discharge, a coffee-cutting mechanism, means for operating the coffee-cutting mechanism and the fan simultaneously, a tube extending from the coffee-cutting mechanism and discharging into the tube which communicates with the coffee-receptacle, a number of cross-rods in the tube communicating with the coffee-receptacle directly below the point where the tube from the coffee-cutting mechanism enters a receptacle to receive the refuse from the coffee, and a screen side in the last-mentioned receptacle..

ELVAH C. SMITH.

Witnesses:
 ELMER HINSHAW,
 E. F. LEAKE.